July 19, 1932.  1,868,240
VEUVE G. LEPINE, NÉE M. T. J. ROUSSEL
PROCESS FOR THE MANUFACTURE OF CEMENT
Filed July 11, 1930
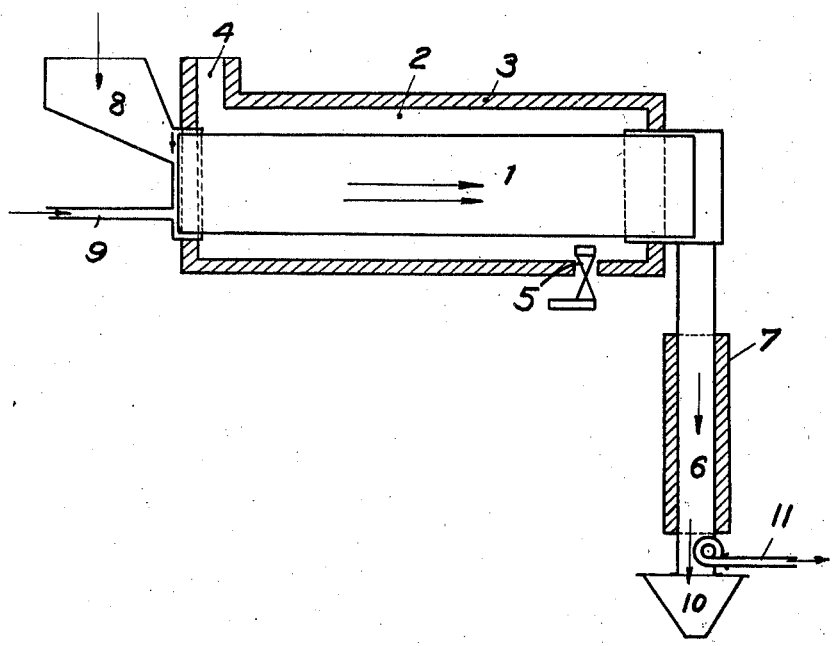
Veuve Georges Lepine, née
Marie Thérèse Josephine Roussel
INVENTOR;
By
Attorney.

Patented July 19, 1932

1,868,240

UNITED STATES PATENT OFFICE

VEUVE GEORGES LEPINE, NÉE MARIE-THÉRÈSE JOSÉPHINE ROUSSEL, OF MEAUX, FRANCE

PROCESS FOR THE MANUFACTURE OF CEMENT

Application filed July 11, 1930, Serial No. 467,376, and in France June 21, 1930.

The object of the present invention is improvements in known processes for manufacture of cement so as to reduce the temperature required, as far as possible, for burning the charge, viz., burning the mixture of clay and lime generally utilized in making cement.

The object of the invention therefore is to reduce to a minimum the consumption of fuel necessary for burning the cement.

The object of the invention also includes the production of a cinder or clinker which is as friable as possible, thus facilitating crushing and enabling the cost of power for crushing to be decreased to a minimum.

The aforesaid objects are attained by the processes plant and products of which the essential features are given in the following specification and particularly in the claims at the end.

The drawing shows a kiln suitable for carrying out the process.

A process for making cement, according to the invention consists in burning the charge in a medium simultaneously made slightly reducing, watery and alkaline, so that the burning may be at a much lower temperature than the temperatures now needed, the cinder obtained being on the other hand, more friable and thus facilitating crushing.

In the process of the invention the reducing medium can be obtained by means of an atmosphere of hydrogen, carbonic oxide, water gas or steam in the presence of incandescent coal, mixed with the charge, this steam itself thus producing the water gas.

The watery medium consists of steam which may be let into the atmosphere of the kiln or form in the kiln itself by a reaction taking place therein.

The alkaline medium can be produced by adding a sodium salt or potassium salt, for example, to the charge.

The reducing watery and alkaline medium can be obtained very simply by the addition of a single product. It is sufficient for this, to put ammonia into the kiln chamber, the ammonia being both alkaline and reducing. Moreover, by its reducing action on the iron oxide and by its water of solution, it produces steam to form the water medium.

The action of the reducing, watery and alkaline medium can be facilitated by producing this action in presence of catalysts, for example metallic catalysts such as platinum or iron. In particular, reduced iron promotes decomposition of the ammonia and thus facilitates the formation and the action of the reducing watery alkaline medium.

After burning, the clinker can be subjected to a tempering operation by sudden cooling in the medium wherein burning took place, viz., in a medium simultaneously slightly reducing, watery and alkaline.

To facilitate this operation of tempering or to replace it supplemental metals can be added to the charge, such as nickel and cobalt (nickel oxalate especially in a proportion of about 1% of the total weight of the charge, the oxalate decomposing under the action of the heat of the kiln and producing nickel dust closely mixed with the charge and cooperating in tempering.)

In the event of the operation of tempering not being perfectly successful, which is shown by the expansion of the lime, manifested by a splitting of the clinker, the tempering operation is corrected by one for annealing.

For this the clinker is reheated in the same reducing, watery alkaline medium, at a temperature of 100° C., for example, during 2 to 3 hours, or at a temperature of 700° C. for a few minutes and then the charge is again suddenly cooled.

Thus a cement of good quality is made without the necessity of keeping it for a long time in the silos.

Although the details of the application of the process can obviously be varied in a number of ways some detailed examples of the application of the process are given herewith.

Example I

1. Quarrying.—An argillous earth is quarried in the district of Bruche (Bas-Rhin), for example, containing:—

| | Per cent |
|---|---|
| Calcium carbonate | 74 |
| Clay | 26 |

The clay has the following composition:

| | Per cent |
|---|---|
| $SiO_2$ | 19 |
| $Fe_2O_3$ $Al_2O_3$ | 7 |

2. Preliminary treatment.—This argillous earth is dried in the open air and finely ground down.

3. Burning.—A charge of 500 kilogrammes of this earth is put into the kiln and 6 to 8% of sodium added (alkaline medium) and 1% nickel oxalate (metal for tempering).

A current of hydrogen and steam (reducing watery medium) is let into the chamber of the kiln.

The kiln is heated at a temperature of about 1000° C.

It suffices to keep the charge at this temperature for about 5 minutes.

4. Cooling and drawing the kiln.—The charge is allowed to cool in the kiln, in the same atmosphere of hydrogen and steam. A black clinker is produced which is conveyed to the ordinary crushers.

Example II (1 and 2) same operations as in Example I.

3. Burning.—A charge of 500 kilos of argillous earth is put into the kiln.

A current of ammoniacal gas is run into the kiln chamber, the kiln having been previously treated to a temperature of about 1000° C.

The charge is kept for about 10 minutes in the kiln, this charge being put in cold.

4. The charge is then suddenly cooled in the ammoniacal atmosphere.

Thus a light grey friable clinker is obtained.

Example III 1 and 2. Same operations as in Example I.

3. Burning.—A charge of 500 kilos of argillous earth is put into the kiln and 6 to 8% of sodium (alkaline medium) added, 1% nickel oxalate (metal for tempering) and 25% of powdered charcoal.

A superheated current of steam is run into the kiln chambers.

The kiln has been previously brought to a temperature of about 1000° C.

It is sufficient to keep the charge in the kiln for about 5 minutes, after having been put in cold.

4. Cooling and drawing.—The charge is allowed to cool in the kiln in the atmosphere of water gas. Thus a black clinker is produced as in Example I.

The invention comprises the aforesaid processes, whatever may be the plant and apparatus utilized for the work.

Nevertheless, the construction of a kiln is shown by way of example in the accompanying drawing, this construction enabling manufacture of cement by the process of the invention to be carried out in a particularly convenient way.

The kiln comprises a movable charge chamber 1, into which the charge is run through a hopper 8, and which is partially lined inside with nickel which forms a catalyst; it is provided with a burner 5 which distributes heat in the heating compartment 2 enclosed in a fire-proof covering 3.

The gases of combustion escape through a chimney 4.

The gases for the reaction, for example, the mixture of hydrogen and steam (Example I) are conveyed into the charge chamber 1 by a pipe 9.

The charge chamber communicates at the back with a tempering pit 6 cooled by a refrigerator 7.

The cinder or clinker is collected in 10 whilst the aspirator 11 removes the gases with a view to their recuperation.

Briefly the invention makes it possible to obtain cements of excellent quality whilst facilitating manufacture. In particular the invention enables a reduction of the burning temperature and thus the cost price of the process.

What I claim as my invention and desire to secure by Letters Patent is:—

1. A process for the manufacture of cement consisting in burning a charge of clay and lime in a medium simultaneously made slightly reducing, watery and alkaline, the clinker thus obtained being then crushed.

2. A process for the manufacture of cement consisting in burning a charge of clay and lime in an atmosphere of ammonia and then crushing the clinker thus produced.

3. A process for the manufacture of cement consisting in burning a charge of clay and lime in a medium simultaneously made slightly reducing, watery and alkaline, in the presence of a metallic catalyst and then crushing the clinker thus obtained.

4. A process for the manufacture of cement, consisting in burning a charge of clay and lime in a medium simultaneously made slightly reducing, watery and alkaline, then subjecting the charge to a tempering operation by sudden cooling in the medium simultaneously made slightly reducing, watery and alkaline, and then crushing the clinker thus obtained.

5. A process for the manufacture of cement consisting in adding a supplemental metal for accelerating or replacing tempering, to the charge of clay and lime, and burning the mixture thus obtained in a medium simultaneously made slightly reducing, watery and alkaline, and then crushing the clinker.

6. A process for the manufacture of cement consisting in adding nickel oxalate to the charge of clay and lime, burning the mixture thus obtained in a medium simultaneously slightly reducing, watery and alkaline and then crushing the clinker.

7. A process for the manufacture of cement, consisting in burning a charge of clay and lime in a medium simultaneously slightly reducing, watery, and alkaline, then subjecting the charge to a tempering operation and an annealing operation in the same medium at a temperature much below that of burning and then crushing the clinker obtained.

In testimony whereof I have signed this specification.

Veuve GEORGES LEPINE, née
MARIE-THÉRÈSE JOSÉPHINE ROUSSEL.